Nov. 26, 1968  P. GREGER ET AL  3,412,665
FILM METERING AND COUNTING MECHANISM WITH SHUTTER INTERLOCKS
Filed Nov. 22, 1965
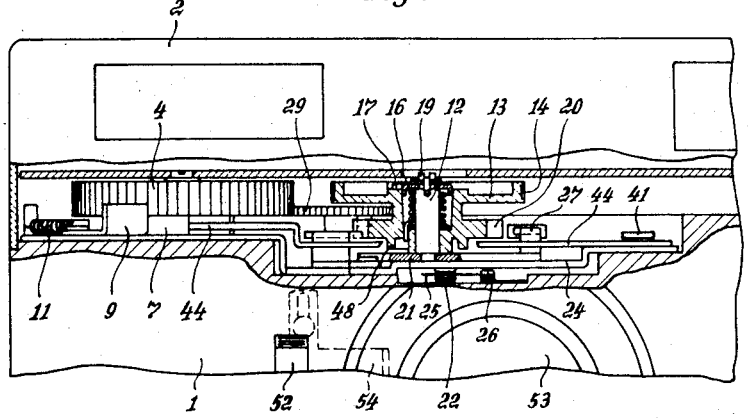
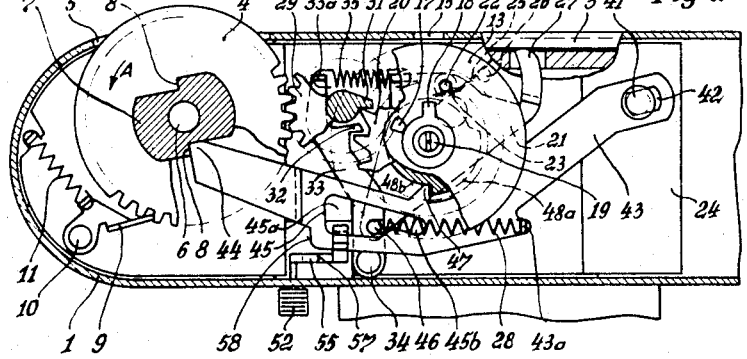
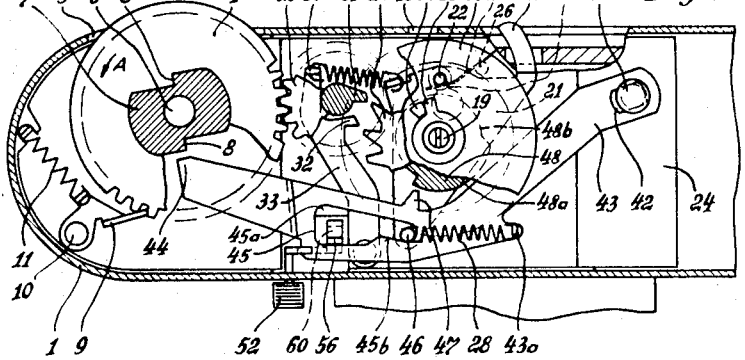

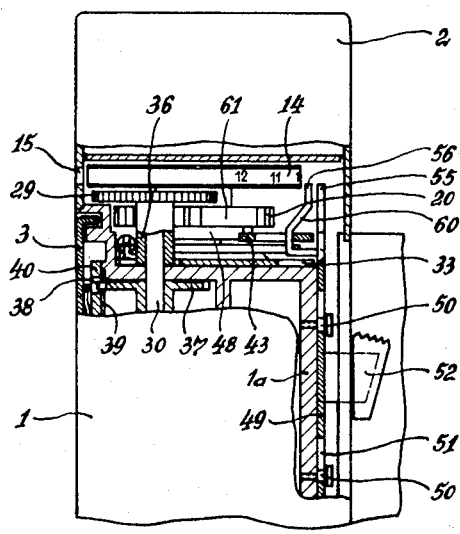

United States Patent Office 3,412,665
Patented Nov. 26, 1968

3,412,665
FILM METERING AND COUNTING MECHANISM
WITH SHUTTER INTERLOCKS
Paul Greger, Braunschweig, and Herbert Weidner, Volkmarode, Germany, assignors to Voigtlander A.G., Braunschweig, Germany, a corporation of Germany
Filed Nov. 22, 1965, Ser. No. 509,142
Claims priority, application Germany, Nov. 25, 1964, V 27,234
14 Claims. (Cl. 95—31)

ABSTRACT OF THE DISCLOSURE

A film metering and exposure counting mechanism for a camera including a double exposure prevention interlock and another interlock which prevents the film from being advanced before the preceding exposure has been made. The counting and metering mechanism is mounted on a moveable carriage. When the camera is open the carriage is displaced and the counter can be returned to the starting position. The counting and metering is accomplished by a tooth wheel which moves one tooth per frame. A blocking pawl which prevents undesired return of the counter is mounted so as to cooperate with the toothed wheel and the moveable carriage.

The present invention relates to cameras.

More particularly, the present invention relates to still cameras in which the unexposed film is advanced frame by frame in order to make successive exposures.

Such cameras are conventionally provided with film-counters which let the operator know how many frames remain to be exposed, as well as structure for advancing the film frame-by-frame and structure, such as a shutter release, for tripping the shutter so as to make the successive exposures.

Cameras of this type conventionally include rotary film-counters connected with toothed wheels which are stepped through a distance of one tooth, for example, at each actuation of the film-advancing means for the purpose of advancing the next unexposed film frame into position for exposure. A spring-loaded non-return pawl acts on the toothed wheel which is connected to the film-counter so as to prevent return thereof to the initial position toward which the film-counter is urged by a suitable spring, for example. However, when the camera is opened, as by displacing its rear wall to a position giving access to the interior of the camera, the spring-pressed non-return pawl is displaced away from the toothed wheel which is connected to the film-counter so that the latter will automatically return to its starting position upon opening of the camera. The film-advancing means itself has a blocking structure with which a spring-loaded blocking lever cooperates to prevent actuation of the film-advancing means beyond the extent required to advance the next film frame into position for exposure. After a full film frame has been advanced into the exposure position the blocking means will automatically prevent further operation of the film-advancing means, and it is only the shutter release which will place the blocking means in a non-blocking position after the shutter release is actuated to make an exposure.

Conventional mechanisms of the above type are complicated, prone to faulty operation, and require an undesirably large amount of space. The transmission from the film-advancing means to the toothed wheel which is connected to the film-counter and which is generally mounted for rotary movement about a stationary axis takes place as a rule by way of a driving pawl. As a result it is essential that the film-advancing means carry out at each operating cycle a reciprocating back-and-forth motion which necessitates the use of a one-way drive between the film-advancing element which is actuated by the operator and the pinion which engages the film to transport the latter. In addition, the path through which it is required to move the driving pawl is relatively great, so that the components of the drive must be moved through a considerable distance into and out of engagement with each other. When the camera is opened for the purpose of changing the film the driving pawl is not displaced to an inoperative position, so that cameras of this type create difficulties in setting the film-counter mechanism when the camera is used with film whose leading end must be displaced into an empty cassette by means of the film-advancing structure of the camera. Furthermore, drives of the above conventional type include non-return pawls which are swingably mounted on special levers which press against the rear wall of the camera during operation of the camera when its rear wall is closed, so that upon opening of the rear wall the levers will turn so as to displace the non-return pawl to a release position where it will no longer prevent the return of the film-counter to its starting position. This latter assembly of a lever with a non-return pawl pivotally mounted thereon provides additional elements which undesirably increase the amount of structure required.

It is therefore a primary object of the present invention to provide mechanism of the above type which is of a simple, robust construction while at the same time being extremely compact, so that only a relatively small amount of space is required, and being free of any likelihood of faulty operation.

In particular, it is an object of the invention to provide a film-advancing structure which does not require any of its components to carry out back-and-forth reciprocating-oscillating motion.

Furthermore, it is an object of the invention to provide a structure which does not require a non-return pawl to be pivotally carried by a lever.

Also, it is an object of the invention to provide for the mechanism of the present invention components many of which carry out a multiplicity of functions, so that in this way the amount of components required is greatly reduced as compared to conventional constructions.

Also, it is an object of the invention to provide a camera in which it is possible to use the film-advancing means for the purpose of feeding a leading end of the film strip into an empty cassette which takes up the exposed film, without creating any difficulties with respect to other components such as the film-counting structure.

It is also an object of the invention to provide a structure which enables the operator to advance the film through a small distance while the camera is open so that the operator can check that the film transporting structure will properly advance the film when the camera is closed, and thus with the structure of the invention the film-advancing means is not blocked when the camera is open.

The objects of the present invention also include the provision of a structure which will not prevent closing of the camera and which will not damage or in any way deform any of the components of the structure if it should happen that when the camera is closed teeth of motion transmitting elements which should mesh butt up against each other instead of properly meshing.

The objects of the present invention also include the provision of a structure whose components are very easy to assembly and mount in the camera.

Among the objects of the present invention is also the provision of a structure for preventing double exposures.

More specifically, it is an object of the invention to provide a cooperation between the film-advancing and shutter release structures which will prevent release of the film-advancing structure until the shutter release is actuated to make an exposure and which will prevent a second actuation of the shutter release until after the film advancing structure has been actuated to displace the next unexposed film frame into position for exposure.

Furthermore, it is an object of the invention to provide a structure, which, while reliably preventing double exposures, nevertheless does not in any way prevent the making of time exposures of any desired duration.

Also, it is an object of the invention to provide a structure which will enable the film to be continuously advanced when the leading and trailing end portions of the film strip are in the region of the focal plane of the camera, without requiring repeated actuations of the shutter release in order to release structure for advancing the film.

Furthermore, in order to reduce the number of components to a minimum, the objects of the invention include an assembly where components which cooperate with each other are directly in engagement with each other without necessitating the use of intermediate motion-transmitting elements.

The camera of the invention has a housing provided with a wall which is displaceable with respect to the remainder of the housing between an open position giving access to the interior of the housing and a closed position closing the housing. Within the camera housing is situated a support means which supports a carrier for movement between outer and inner positions. A spring means is operatively connected to the carrier to urge it to its outer position when the wall of the housing is in its open position, and when the housing wall is displaced to its closed position this housing wall displaces the carrier from its outer to its inner position in opposition to the spring means. This carrier supports a rotary film-counter as well as a toothed wheel which is coaxially fixed with the film-counter, and a film-advancing means has its motion transmitted to the toothed wheel through an advancing tooth which advances the toothed wheel through a distance of one tooth at each actuation of the film-advancing means so that in this way the film-counter is advanced whenever a new film frame is displaced into position for exposure. In addition to the advancing tooth, a non-return tooth cooperates with the teeth of the toothed wheel for preventing return of the film-counter to its starting position. When the wall of the camera housing is moved from its closed to its open position the spring means will displace the carrier from its inner to its outer position, and the extent of this displacement is sufficient to situate the toothed wheel beyond the range of operation of the advancing tooth and the non-return tooth, so that when the carrier is in its outer position, the film-counter can be freely moved back to a predetermined starting position.

The invention is illustrated by way of example in the accompanying drawings which form part of the application and in which:

FIG. 1 is a fragmentary front elevation of a camera provided with the structure of the invention, part of the front wall shown in FIG. 1 being broken away to illustrate in section the structure of the invention which is situated behind this front wall;

FIG. 2 is a sectional plan view of the structure of FIG. 1 taken in a plane just above the film-counter and film advancing means so as to illustrate the details of the structure which is shown in FIG. 2 in a position where the shutter release can be actuated so as to make an exposure;

FIG. 3 shows the position which the parts of FIG. 2 take when the rear wall of the camera has been displaced to an open position;

FIG. 4 is a fragmentary partly sectional side elevation showing further details; and FIG. 5 is a fragmentary elevation of the shutter release of the camera.

Referring to the drawings, there is shown therein a camera housing 1 carrying at its upper portion a hollow cap or enclosure 2 in which various assemblies are accommodated on top of the camera housing 1. These assemblies may include units such as the viewfinder, rangefinder, flash apparatus, and the like. The camera housing 1 includes a wall 3 which is displaceable with respect to the remainder of the housing 1 between a closed position shown in FIG. 2 where the wall 3 closes the housing 1 and an open position where the wall 3 is displaced away from the housing 1 so as to give access to the interior thereof, and the wall 3 has been displaced to its open position to provide the position of the parts shown in FIG. 3 where the wall 3 is not visible. This wall 3 forms in the illustrated example a rear wall of the camera housing and it may either be connected to the camera housing in such a way that this rear wall 3 is completely removed from the remainder of the housing so as to give access to the interior thereof or the rear wall 3 may, for example, be hingedly connected to the remainder of the housing so as to be swingable between the open and closed positions.

The camera housing 1 accommodates within its outer walls inner walls and plates and the like which form a support means for the structure carried by the camera housing 1 in its interior. This structure includes a film-transporting means which will advance the film after one frame is exposed so as to situate the next unexposed frame at the focal plane of the camera in position for exposure. In addition, the support means carries a film-counting mechanism which will indicate to the operator how many exposures remain to be made before the film has to be changed, and the film-transporting structure as well as the film-counting structure are driven from a transmission constructed in accordance with the invention and also carried by the support means.

This transmission includes a rotary driving member 4 which has the construction of a simple gear. This rotary gear 4 extends at part of its periphery through an opening in the camera housing to the exterior thereof. Thus, FIGS. 2 and 3 clearly illustrate part of the gear 4 projecting through the opening 5 of the camera housing to the exterior of the latter. In this way a part of the gear 4 is accessible to the operator so that the operator can manually turn the gear 4 by directly engaging this gear.

The gear 4 is directly fixed to a rotary shaft 6 which is turnably supported for rotation about its axis by any suitable bearings in the interior of the housing 1. A toothed blocking cam 7 is also fixed to the shaft 6 for rotation therewith, and this toothed blocking cam 7 has a pair of diametrically opposed teeth 8 angularly displaced with respect to each other by 180 degrees about the axis of the shaft 6. A non-return pawl 9 engages the teeth of the gear 4. This pawl 9 is supported for turning movement by a stationary pivot 10 carried by any suitable supporting wall in the camera. A spring 11 is operatively connected with the pawl 9 for urging the latter to turn in a counter-clockwise direction, as viewed in FIGS. 2 and 3, into engagement with the teeth of the driving gear 4 of the film-advancing means. In this way, while it is possible for the operator to turn the gear 4 in the direction of the arrow A, indicated in FIGS. 2 and 3, it is not possible for the operator to turn the gear 4 in the opposite direction.

A shaft 12 which is parallel with the shaft 6 supports for rotary movement a film-counter in the form of a rotary member 13 which is freely turnable on the shaft 12. This rotary film-counter 13 has an outer upper peripheral portion which carries a scale 14 of frame numbers. This scale 14 is visible through a window 15 in an upper rear wall portion of the camera housing. As is apparent from FIG. 4 the movable rear wall 3 of the camera housing is situated beneath a stationary rear wall portion which is provided with the window 15. A coil spring 16 surrounds the shaft 12 and is fixed at one end with the film-counter 13 and at its opposite end with the shaft 12. This spring 16 urges the film-counter 13 toward the starting position thereof which is illustrated in FIG. 3. In this latter starting position a stop member 17 which is fixedly carried by the film counter 13 engages a stop member 18 which is carried by the shaft 12. The angular position of the stop member 18 can be adjusted. For this purpose a bolt 19 passes through an opening of a plate which is integral with the stop 18 and which is situated on the top end of the shaft 12, and the bolt 19 is threaded into a tapped bore extending axially into the interior of the shaft 12 from its top end, so that by loosening and tightening the bolt 19 it is possible to fix the stop 18 at an adjusted angular position with respect to the axis of the shaft 12. In this way the spring 16 always seeks to return the film-counter 13 to the starting position thereof, which is illustrated in FIG. 3 and where the stop 17 engages the stop 18.

The film-counter 13 is integrally and coaxially fixed with a toothed wheel 20 whose teeth have the configuration most clearly indicated in FIGS. 2 and 3. Thus, the film-counter 13 together with the toothed wheel 20 are supported for free rotary movement about the shaft 12.

This shaft 12 is fixedly mounted on a carrier 21 which is provided with a pivot pin 22. This pivot pin 22 extends through an elongated guide opening 23 which is formed in a supporting plate 24 which is fixed to the camera housing 1 in the interior thereof. A spring 25 engages the pivot 22 for maintainnig the latter in the guide opening or slot 23 of the supporting plate 24 which forms part of the support means referred to above. Thus, as is indicated in FIG. 1 the spring 25 has an elongated free end portion in the form of a wire extending into an annular groove formed in the pivot pin 22 at a portion thereof which is situated beneath the supporting plate 24 while the upper portion of the pivot pin 22 is fixed to the carrier 21 which rests directly on the plate 24 with the pin 22 extending through the slot 23, so that in this way the spring 25 serves to retain the carrier 21 in its assembled condition with the supporting plate 24. The spring 25 is itself coiled about a stationary supporting pin 26 carried by a stationary wall of the camera and situated beneath the plate 24. As is apparent from FIGS. 2 and 3, the slot 23 has the configuration of a keyhole slot so that the pivot pin 22 can be introduced into the larger diameter end of this slot and then displaced at a narrow neck portion of the pivot pin 22 along the narrower elongated part of the slot which projects from the wider circular part thereof, and the spring 25 urges the pin 22 to the end of the narrow elongated part of the slot which is most distant from its wider circular portion.

The carrier 21 includes an elongated projecting portion 27 which presses against the wall 3 of the camera when this wall is in its position closing the camera housing 1. A spring 28 is connected at one end to the carrier 21 and urges the latter to turn in a counter-clockwise direction about the axis of the pivot pin 22, so that it is this spring 28 which urges the projection 27 of the carrier 21 against the inner surface of the rear wall 3 of the camera when this rear wall is in its closed position shown in FIG. 2. It is to be noted that the elongated guide opening 23 extends essentially in a direction parallel to the direction of movement of the projection 27 when the wall 3 is displaced between its open and closed position.

In this way the carrier 21 is provided with outer and inner positions. It is shown in its inner position in FIG. 2 and in its outer position in FIG. 3. When the wall 3 of the camera housing is displaced from its open to its closed position, it will engage the projection 27 and displace the carrier 21 in opposition to the spring 28 from its outer to its inner position shown in FIG. 2. On the other hand, when the wall 3 of the camera is displaced to its open position, the spring 28 will move the carrier 21 from its inner to its outer position which is indicated in FIG. 3.

In order to transmit the rotary movement of the driving gear 4 to the toothed wheel 20 of the film-counting mechanism, an intermediate gear 29 is provided. This gear 29 is at all times in mesh with the gear 4. The gear 29 is fixedly mounted on a rotary shaft 30 supported for rotation by any suitable stationary bearings of the camera, and this shaft 30 is shown in FIG. 4. The shaft 30 extends parallel to the shafts 6 and 12.

The intermediate gear 29 has at its underside an elongated tubular hub which is integral with the gear 29 and which receives and is fixed to the shaft 30, and this elongated hub is integral with an advancing tooth 31 which meshes with the teeth of the toothed wheel 20 in the manner shown in FIG. 2, so that at each revolution of the intermediate gear 29 toothed wheel 20 will be advanced by a distance of one tooth. In order to prevent return of the toothed wheel 20 after it has been advanced together with the disc 13 by the advancing tooth 31, a non-return tooth 32 is provided, and this tooth 32 also cooperates with the teeth of the wheel 20 in the manner shown most clearly in FIG. 2. The non-return tooth 32 forms an integral part of an elongated lever 33 which is supported for turning movement by a stationary pivot 34 carried by a stationary part of the camera. This lever 33 has beyond the non-return tooth 32 and extension 33a to which one end of an elongated spring 35 is connected. The other end of the spring 35 is connected to the carrier 21. In this way the spring 35 maintains the extension 33a of the lever 33 in engagement with the elongated hub of the intermediate gear 29. This hub projects downwardly beyond the advancing tooth 31 which is situated at the elevation of the toothed wheel 20. The elongated hub 36 of the gear 29 is shown most clearly in FIG. 4.

The rotary shaft 30 in addition fixedly carries a film-advancing pinion 37 whose teeth 38 extend into the perforations of the film strip 39, as indicated in FIG. 4. This film strip 39 is guided for movement along a pressure plate 40, as is well known in the art.

The releasable blocking means which cooperates with the film-advancing means in a manner described in greater detail below, includes, in addition to the toothed blocking cam 7, an elongated blocking lever 43 which is formed with an elongated slot 42 which receives a stationary pivot 41 which is fixedly carried by the plate 24. In this way, the blocking lever 43 is supported for longitudinal as well as turning movement. The blocking lever 43 has distant from the pivot 41 a toothed end 44 which cooperates with the toothed blocking cam 7. In addition, the blocking lever 43 is formed with an elongated control opening 45 which has a left relatively wide portion 45a and a right relatively narrow portion 45b, as is apparent from FIGS. 2 and 3. This control opening 45 of the blocking lever 43 receives a control pin 46 which is fixedly carried by the carrier 21. The spring 28 is connected at one end to the control pin 46 so as to act through the latter on the carrier 21 for urging it to its outer position, as described above. The other end of the spring 28 is connected with a projection 43a in the form of a lug integral with and projecting from the blocking lever 43. Thus, the spring 28 urges the blocking lever 43 to the left and the carrier 21 in a counter-clockwise direction, as viewed in FIGS. 2 and 3.

The blocking lever 43 is further integral with a rearwardly extending projection 47 which forms part of the lever 43 and which is directly engaged by a cam 48 which is integral with the film-counter 13. This cam 48 has an outer portion 48a and an inner portion 48b. These outer and inner portions 48a and 48b extend along concentric circles whose common center is situated in the axis of the shaft 12. Thus, the radius of the inner camming portion 48b is smaller than that of the outer camming portion 48a.

The camera further includes a shutter release means which can be manually actuated and which takes the form of a vertically shiftable member 49 shown most clearly in FIGS. 4 and 5. The shutter release member 49 is vertically movable along the camera housing wall 1a. This wall carries a plurality of guide means 50 which are received in elongated slots 51 of the lever 49 so as to guide the latter for vertical movement through a distance determined by the length of the slots 51. The shutter release 49 is fixedly connected with a manually-engageable finger-piece 52 situated at the exterior of the camera so that the operator by engaging the finger-piece 52 can displace the shutter release 49 downwardly from its upper starting position to which it is urged by an unillustrated spring. Thus, when the operator engages the finger-piece 52 to displace it downwardly together with the shutter release 49, this action will take place in opposition to the spring which seeks to return the shutter release to its upper starting position. As may be seen from FIG. 1, the shutter release 49 carries a release arm 54 which acts on part of the shutter which is housed in the objective 53 so as to trip and release the shutter in order to make an exposure in a conventional and therefore unillustrated manner.

At its upper end the shutter release 49 is provided with a pair of lugs 55 and 56. The lug 55 is situated beside the blocking lever 43 and extends upwardly past the blocking lever 43. This lug 55 has a retarding edge 57 directed toward a stop-edge 58 of the blocking lever 43. Just beneath the upper portion of the lug 55 which has the retarding edge 57, the shutter release 49 is formed with a locking notch 59.

The other lug 56 of the shutter release is bent out of the plane of the remainder of the shutter release 49 and extends first beneath the blocking lever 43 then upwardly through the wider portion 45a of the control opening 45 thereof, and just over the blocking lever 43 the lug 56 has a forwardly and upwardly inclined camming portion 60 which is inclined with respect to the plane of the blocking lever 43 in the manner shown most clearly in FIG. 4.

The operation of the structure described above and shown in the drawing is referred to below in connection with a camera which receives a cassette of unexposed film of the type where a leading end of the film strip projects from the cassette and is pushed into a matching empty film cassette which is carried by the camera for the purpose of receiving the exposed film. The advancing of the leading end of the film strip from the supply cassette into the take-up cassette is brought about by actuation of the film-advancing means of the camera.

In order to initially introduce a supply of unexposed film into the camera, the rear wall 3 thereof is of course displaced to the open position giving access to the interior of the camera housing 1. As a result the extension 27 of the carrier 21 can no longer press against the rear wall 3, and therefore the spring 28 turns the carrier 21 about the axis of the pivot 22 in a counterclockwise direction, as viewed in FIGS. 2 and 3 from the position in FIG. 2 to the position of FIG. 3. As a result the toothed wheel 20 moves out of meshing engagement with the advancing tooth 31 and the non-return tooth 32. Therefore, there is nothing to resist the return of the film counter 13 back to its initial position under the urging of the spring 16. At the same time, it is possible for the operator to turn the driving gear 4 without having any influence on the film-counter 13. At this time the intermediate gear 29 will be rotated by the manual turning of the gear 4, so that the film-transporting pinion 37 will also rotate and the film 39 can be advanced through a relatively short distance for checking purposes. In other words, while the camera housing is in its open position it is possible for the operator to turn the gear 4 through a short distance and check as to whether or not the film is actually being advanced, so that the operator can satisfy himself that the film-advancing means is cooperating properly with the film strip to advance the latter. It is to be noted that at this time the rotary movement of the driving gear 4 is not in any way retarded by the blocking lever 43. When the carrier 21 turns from its inner to its outer position, the control pin 46 turns into the smaller section 45b of the control opening 45 and engages the blocking lever 43 to displace its end 44 beyond the range of the blocking teeth 8 of the blocking cam 7. The shutter release 49 at this time is in its starting position which is shown in the drawings.

The operator will now return the wall 3 of the camera housing to its closed position in which it is releasably maintained in any manner well known in the art. The wall 3 will therefore engage the extension 27 of the carrier 21 and displace the latter in opposition to the spring 28 from the outer position of the carrier 21 shown in FIG. 3 back into the inner position thereof shown in FIG. 2, and at this time the carrier 21 turns in a clockwise direction, about the axis of the pivot 22, as viewed in FIGS. 2 and 3. In this way the toothed wheel 20 is again placed in mesh with the advancing tooth 31 and the nonreturn tooth 32.

If it should happen, however, that the advancing tooth 31 is directly in line with one of the teeth of the wheel 20 so that a tooth of the wheel 20 butts up against the advancing tooth 31, as may occur, if the parts have a position such as that shown in FIG. 3, then it is possible for the spring 25 to yield while the pivot pin 22 of the carrier 21 is displaced along the guide opening 23. In this way any damaging of the components by bending thereof or preventing of displacement of the wall 3 to its closed position, is avoided. During the course of turning the gear 4 the parts will again resume their proper cooperating positions and the spring 25 will return the pin 22 into its location at the rear end of the guiding slot 23. It may happen that the alignment of the advancing tooth 31 with one of the teeth of the wheel 20 is such that the slight yielding movement which can be provided with the above-described structure of the invention, is sufficient to displace the parts into proper cooperating relationship.

The return of the carrier 21 to its inner position will displace the control pin 46 from the smaller section 45b of the control opening 45. However, the toothed end 44 of the blocking lever 43 still will not engage one of the blocking teeth 8 of the blocking cam 7 since at this time the integral projection 47 of the blocking lever engages the outer camming portion 48a of the cam 48. When this outer camming portion 48a engages the projection 47 the lever 43 is maintained at a position where its toothed end 44 is beyond the range of the teeth 8.

The operator will now turn the driving gear 4 in the direction of the arrow A, so as to transmit the rotation through the intermediate gear 29 and the transporting pinion 37 to the leading end of the film which is advanced in this way through the focal plane past the unillustrated film gate and into the empty cassette. As soon as the first frame which is to be exposed reaches the film gate, the outer camming portion 48a turns beyond the projection 47 and the inner camming portion 48b is now situated opposite the projection 47, so that the blocking lever 43 can now be displaced by the spring 28 to the location where the toothed end 44 will engage the next blocking tooth 8 which reaches lever 43. It is possible for the lever 43 to turn into this latter position at this time because the control pin 46 is now situated in the wider section 45a of the control opening 45. Thus, the transportation of the film by the film-advancing means of the invention is blocked and the camera is ready to make an exposure. The film-counter 13 will indicate in the window 15 that the first film frame is in position to be exposed. The parts now have the position indicated in FIG. 2.

In order to make an exposure the operator will press downwardly on the finger-piece 52. The shutter release 49 will therefore move downwardly, as viewed in FIG. 4. The inclined camming portion of the lug 56 will press against the forward edge of the opening 45 of the blocking lever 43 so as to turn the blocking lever 43 in a counter-clockwise direction about the pivot 41, as viewed in FIGS. 2 and 3. The toothed end 44 of the blocking lever 43 therefore moves away from the blocking tooth 8 with which it was previously in engagement. As soon as the toothed end 44 of the lever 43 is displaced beyond the tooth 8 which happens to be in the forward position shown in FIG. 2, the spring 28 will displace the blocking lever to the left, as viewed in FIGS. 1–3, so that the toothed end 44 will engage an exterior surface of the cam 7 adjacent but beyond the forward tooth 8 thereof. The longitudinal displacement of the lever 43 to the left from the position of FIG. 2 is made possible because of the elongated slot 42. However, as long as the operator maintains the shutter release 49 in its lower position, the extent to which the lever 43 can shift longitudinally to the left under the influence of the spring 28, is limited because the stop edge 58 will at this time engage the retarding edge 57 of the shutter release 49. Only when the operator releases the shutter release 49 so that the unillustrated spring returns it to its initial position, will the retarding edge 57 move upwardly beyond the edge 58. Now the spring 28 can continue to advance the blocking lever 43 to the left, and a portion of the blocking lever 43 will now enter into the locking notch 59 of the shutter release 49. As a result it is not possible for the operator to again actuate the shutter release. With the portion of the lever 43 adjoining its stop edge 58 situated in the locking notch 59, as indicated in FIG. 5, the blocking lever 43 serves to prevent downward movement of the shutter release 49, so that in this way a second actuation of the shutter and a double exposure is avoided.

After the exposure is made, the operator will turn the driving gear 4 in the direction of the arrow A in order to displace the next unexposed film frame into the focal plane in a position for exposure. At this time the next blocking tooth 8 of the blocking cam 7 will engage the toothed end 44 of the lever 43 and will displace the lever 43 in opposition to the spring 28 back into the position shown in FIG. 2. At this time the blocking lever 43 is, of course, displaced to the right, as viewed in FIGS. 2 and 3. When the left end of the slot 42 reaches the pivot 41, as shown in FIG. 2, the lever 43 can no longer be displaced to the right and thus the operator can no longer turn the gear 4, so that the transportation of the film is necessarily terminated, and in this way the operator knows that the next film frame has been properly positioned for exposure. At the same time, this displacement of the blocking lever to the right, into the position shown in FIG. 2, moves the portion of the lever which includes the stop edge 58 out of the locking notch 59, so that the shutter release is now again free to be actuated by the operator.

During the turning of the driving gear 4, the intermediate gear 29 is also turned. The transmission ratio between the gear 4 and the gear 29 is such that, in the illustrated example, the gear 29 will turn through two revolutions at each revolution of the gear 4, so that when the latter has been turned through one half a revolution, the gear 29 will have been turned through a full revolution. Thus, at each operating cycle when the film is advanced by one film frame, the gear 4 will turn through a half revolution and the gear 29 will turn through a full revolution. This turning of the gear 29 takes place in a clockwise direction, as viewed in FIG. 3, so that the advancing tooth 31 also turns in a clockwise direction. Thus, at each revolution of the gear 29 the advancing tooth 31 will engage a tooth of the wheel 20 in order to advance the latter through the angular distance of one tooth, and in this way the counting disc 13 turns in a counter-clockwise direction together with the tooth 20, so that the next graduation of the film-counting scale becomes visible in the window 15. Return of the film-counting mechanism by the spring 16 is prevented by the non-return tooth 32. Thus, after each of these operating cycles the camera is against ready for the next exposure, and the above operations are repeated.

As soon as the portion of the film which is intended to be exposed has passed completely through the focal plane the outer camming portion 48a will again reach the projection 47 of the lever 43 to displace the latter so that its toothed end 44 is beyond the range of the blocking teeth 8. Now the operator can continue to turn the gear 4 so as to displace the film strip completely out of the supply cassette and into the take-up cassette, this operation continuing until a predetermined length of film projects from the take-up cassette. This operation can take place without any requirement that the operator actuate the camera shutter.

In order to prevent turning of the film-counter 13 beyond the final graduation of its scale, when the trailing end of the film is removed from the supply reel, the toothed wheel 20 is provided with an elongated tooth gap 61, indicated in FIG. 4. When the advancing tooth 31 reaches the longer tooth gap 61 of the toothed wheel 20, the advancing tooth 31 can turn freely with respect to the wheel 20 without engaging any tooth thereof and thus without turning the wheel 20 further, so that a further advancing of the film-counter 13 is prevented at this time.

When the exposed film is thus situated in the take-up cassette, the rear wall of the camera 3 is displaced to its open position. The carrier 21 will therefore automatically be displaced by the spring 28 to its outer position shown in FIG. 3, so that the drive to the film-counting structure is disconnected, as described above. The film-counter 13 can therefore be returned by the spring 16 to its starting position where the stop 17 engages the stop 18. The exposed film is now removed from the camera.

The camera is then charged with unexposed film and the above-described operations are repeated.

It is to be noted that with the above-described structure of the invention the film-advancing means operates at all times in only one direction of movement. In other words the gear 4 turns only in the direction of the arrow A, gear 29 turns only in a clockwise direction, as viewed in FIGS. 2 and 3, and of course the pinion 37 will always turn in only one direction. In this way the structure of the invention eliminates any parts which are required to reciprocate or oscillate back and forth. It therefore becomes unnecessary to include in the transmission any type of one-way drive. In particular, such a one-way drive is not required between the driving gear 4 and the film transporting pinion 37.

The feature of the invention according to which the carrier 21 is displaced automatically to its outer position upon opening of the camera housing results in movement of the teeth of the wheel 20 beyond the range of the film-advancing tooth 31 and non-return tooth 32. As a result this latter non-return tooth need not take the form of a pawl which is pivotally carried by a special lever. Instead the simple structure according to which the tooth 32 is an integral part of the lever 33 can be provided. Moreover, the advancing tooth 31 cannot, with this construction, in any way interfere with the return of the counter to its starting position, or with actuation of the film-advancing structure, as long as the camera remains open. Thus it is possible to provide with the invention a transmission which requires only a small number of elements which can be mounted in a small space while assuring a proper operation of the parts.

It is to be noted that the carrier 21 through the control pin 46 serves the additional function of displacing the blocking lever 43 to a non-blocking position as long as the rear wall of the camera is in its open position. This operation of course makes it possible for the operator to actuate the film-advancing structure while the camera is open so as to check that proper advance of the film will take place. Therefore, with the structure of the invention it is possible to provide a fully operative film-advancing means even when the camera is in its open position.

Of course, as was pointed out above, the feature of providing a yieldable mounting for the pivot 22 of the carrier 21, by way of the spring 25 and the elongated slot 23, will prevent any damage to the components while enabling the rear wall of the camera to be displaced to its closed position, even if the cooperating teeth should not be properly aligned so as to move into meshing engagement.

The assembly of the components is also quite simple since the pin 22 need only be passed downwardly through the larger end of the keyhole slot 23 and then displaced along the narrow portion of the slot with the spring 25 placed in engagement with the part of the pin 22 which extends beneath the plate 24. In this simple way the carrier 21 is assembled with the supporting plate 24.

The interrelationship between the shutter release means and blocking means of the invention also is of considerable advantage. Thus, the blocking lever 43 whose primary purpose is to prevent actuation of the film-transporting means beyond the extent required to advance the next film frame into position for exposure also performs the function of preventing a second actuation of the shutter which could result in a double exposure. With the structure of the invention the shutter release operates to displace the blocking means from its blocking position and the blocking means operates to release the shutter release for operation. The actuation of the shutter release will release the blocking means so that the film transporting means can again be actuated, and the shutter release is prevented from a second operation until after the blocking lever has been moved back to the position it takes when the next unexposed film frame has reached the focal plane and is in position for exposure. This alternate blocking and unblocking of the film transport and shutter release by their cooperation with each other, as described above, can be carried out in such a way that the movements are completely separated from each other inasmuch as the blocking means for the film-advancing structure is carried out by actuation of a turnable lever, whereas the shutter release involves only a shifting, rather than an angular movement.

It is furthermore to be noted that the blocking of the second operation of the shutter release does not take place until after the shutter release has returned to its starting position. This is of importance since it makes it possible to provide time exposures of any desired duration before the shutter release returns to its starting position in which it is locked until the next film frame has been advanced into position for exposure.

The fact that the blocking lever 43 has the integral projection 47 which cooperates with the cam 48 also greatly simplifies the structure, since in this way the lever 43 and the came 48 cooperate directly and it is unnecessary to interpose any motion-transmitting elements therebetween.

A further simplification is achieved by connecting the spring 28 at its ends respectively to the carrier 21, by way of the pin 46, and to the lever 43, by way of the lug 43a. In this way only a single spring is used on the one hand to urge the carrier to its outer position and on the other hand to urge the blocking level 43 to the left, as viewed in FIGS. 2 and 3.

In addition, the location of part of the gear 4 at the exterior of the camera where it is accessible to the operator, eliminates the necessity of a special knob or other manually engageable element to be provided. The gear 4 itself is directly engaged by the operator, thus maintaining the number of parts at a minimum.

While all of the above described parts of the invention cooperate very well with each other in the manner described above, it is possible for various parts to be used in other combinations. For example, the structure for preventing damage to the elements if the teeth of a pair of gears should butt up against each other instead of moving into mesh with each other, can be used more generally and is not limited to the particular combination described above and shown in the drawings. Also, the above-described cooperation between the blocking means and shutter release can be used with any film-counting structure.

What is claimed is:

1. In a camera, a camera housing including a wall displaceable with respect to the remainder of said housing between an open position opening said housing and a closed position closing said housing, support means carried by said housing in the interior thereof, a carrier supported by said support means for movement between outer and inner positions, spring means operatively connected to said carrier for displacing the latter to said outer position thereof when said wall of said housing is in its open position, said housing wall when returned to its closed position displacing said carrier from its outer to its inner position in opposition to said spring means, a rotary film counter supported for rotation on said carrier, a toothed wheel coaxially fixed to said film counter for rotation therewith, a rotary advancing tooth engaging one of the teeth of said toothed wheel for advancing the latter and said film counter therewith during turning of said advancing tooth, and a non-return tooth engaging another tooth of said toothed wheel to prevent the latter from turning in a direction opposite to that in which it is advanced by said advancing tooth, said carrier when moving from its inner to its outer position in response to displacement of said housing wall from its closed to its open position displacing said toothed wheel beyond the range of action of said advancing tooth and non-return tooth so that when said housing wall is in its open position said rotary film counter can turn freely without being influenced by said advancing tooth and non-return tooth.

2. The combination of claim 1 and wherein said support means supports said carrier for turning movement about an axis which is parallel to the axis about which said counter and toothed wheel turn.

3. The combination of claim 1 and wherein said support means supports for rotary movement a driving gear and an intermediate gear meshing with said driving gear and coaxially fixed with said advancing tooth.

4. The combination of claim 1 and wherein said displaceable housing wall is a rear wall of the camera housing and said carrier having a projection engaging said rear wall when the latter is in its closed position, said projection being pressed against said rear wall by said spring means while said rear wall is in its closed position.

5. The combination of claim 1 and wherein a film-advancing means is carried by said support means for advancing the film in preparation for the next exposure, and blocking means carried by said support means for blocking operation of said film-advancing means after the latter has been actuated to advance the next unexposed film frame into position for exposure, said blocking means being movably supported by said support means for movement between blocking and non-blocking positions, and said carrier carrying a control projection which engages said blocking means and displaces the latter to its non-blocking position when said carrier is displaced by said spring means to its outer position upon movement of said camera wall to its open position.

6. The combination of claim 1 and wherein said carrier includes a projection pressed by said spring means against said wall of said housing when said wall is in said closed position thereof and said projection moving in a predetermined direction during displacement of said carrier from said inner to said outer position thereof upon movement of said housing wall from its closed to its open position, said support means including a pivot pin pivotally supporting said carrier for turning movement between said positions thereof and an elongated guide in which said pivot pin is movable, said guide extending in a direction substantially parallel to the direction in which said projection of said carrier moves when said carrier is displaced from its inner to its outer position, and second spring means engaging said pivot pin for yieldably maintaining the latter in a predetermined position along said guide of said support means.

7. The combination of claim 6 and wherein said support means includes a wall formed with an elongated slot extending in the direction of movement of said projection of said carrier when said carrier is displaced from its inner to its outer position, and said slot receiving said pivot pin so as to guide the latter for movement along said slot, said second spring means engaging said pivot pin for yieldably maintaining the latter at one end of said slot.

8. The combination of claim 1 and wherein a rotary film-advancing means is supported for rotation by said support means, a toothed blocking cam carried by said rotary film advancing means for turning movement therewith, and an elongated blocking lever supported by said support means for longitudinal and turning movement and engaging said toothed blocking cam, a second spring means urging said lever into engagement with said cam, and shutter-release means movably carried by said support means and accessible to the operator for releasing a shutter of the camera to make an exposure, said shutter release means having a camming portion engaging said blocking lever and displacing the latter from a position engaging said cam to block further operation of said film-advancing means when said shutter release means is actuated to make an exposure, said shutter release means having a locking notch into which said second spring means displaces said lever upon return of said shutter release means to a predetermined starting position so that a second operation of said shutter release means is prevented by displacement of said lever into said notch of said shutter release means, said cam during actuation of said film-advancing means to displace the next unexposed film frame into position for exposure returning said blocking lever in opposition to said second spring means to a predetermined starting position where it is situated out of said notch and cooperates with a tooth of said blocking cam to prevent actuation of said film-advancing means beyond the extent required to displace the next film frame in position for exposure, so that simultaneously with blocking the extent of operation of said film-advancing means said blocking lever releases said shutter release means for operation only when the next film frame has been displaced into position for exposure.

9. In a camera, support means, rotary film-advancing means supported for rotation by said support means and accessible to the operator for advancing in the camera film to be exposed therein, a toothed blocking cam carried by said rotary film-advancing means for rotation therewith, an elongated blocking lever supported by said support means for turning and longitudinal movement and having a free end engaging said tooth-blocking cam after said film-advancing means has been actuated to advance the film so as to prevent advancing of the film by more than the extent required to displace the next unexposed film frame into position for exposure, spring means urging said lever toward said cam, and shutter release means carried by said support means for movement away from a predetermined starting position to make an exposure and then back to said predetermined starting position in preparation for the next exposure, said shutter release means having a camming portion which engages said lever and cams the latter away from its blocking operation of said film-advancing means when said shutter release means is displaced away from its starting position in order to make an exposure, said shutter release means being formed with a locking notch into which said spring means advances said blocking lever upon return of said shutter release means to said starting position thereof after an exposure has been made, so that said blocking lever will then prevent actuation of said shutter release means to make a second exposure, and said toothed blocking cam during actuation of said film-advancing means to advance the next film frame into position for exposure engaging said blocking lever and displacing the latter out of said notch of said shutter release means and into a position engaging a tooth of said blocking cam for preventing actuation of said film-advancing means beyond the extent required to advance the next film frame into position for exposure, whereby when the next film frame is thus positioned for exposure said shutter release means is released for operation, said shutter release means including a blocking edge engaging said blocking lever and preventing movement of the latter into said notch until said shutter release means returns to said starting position thereof.

10. The combination of claim 1 and wherein a film-advancing means is supported for rotation by said support means, and blocking means releasably blocking operation of said film-advancing means beyond the extent required to advance the next unexposed film frame into position for exposure, said blocking means including a toothed blocking cam connected to said film-advancing means for movement therewith and an elongated blocking lever engaging said cam, said blocking lever having a projection fixed thereto and said film counter carrying a cam which engages said projection of said lever to hold the latter in a non-blocking position when the initial and final portions of a film strip have reached the region of the focal plane of the camera.

11. The combination of claim 1 and wherein a film-advancing means is carried by said support means, and blocking means also carried by said support means and releasably blocking operation of said film-advancing means beyond the extent required to advance the next unexposed film frame into position for exposure, said spring means acting on said blocking means for rendering the latter operative, so that a single spring means is used both for said blocking means and for said carrier.

12. The combination of claim 11 and wherein said single spring means is in the form of a single spring having opposed ends respectively connected with said carrier and said blocking means.

13. The combination of claim 1 and wherein a rotary driving gear is supported for rotation by said support means and forms part of a film-advancing means, and an intermediate gear meshing with said rotary driving gear and coaxially carrying said advancing tooth, said camera housing being formed with an opening through which part of said driving gear extends to the exterior of the camera so that part of the latter gear is accessible to the operator to be manually turned.

14. The combination of claim 13 and wherein a film-advancing gear is coaxially fixed with said intermediate gear for rotation therewith.

References Cited
UNITED STATES PATENTS

| | | | |
|---|---|---|---|
| 2,148,636 | 2/1936 | Muller et al. | 95—31 |
| 3,148,605 | 9/1964 | Peterson et al. | 95—31 |
| 3,232,196 | 2/1966 | Sapp et al. | 95—31 |

NORTON ANSHER, *Primary Examiner.*

R. A. SCHROEDER, *Assistant Examiner.*